J. P. MILLER.
TUG CONNECTOR FOR HARNESS.
APPLICATION FILED AUG. 4, 1915.
1,185,122.
Patented May 30, 1916.
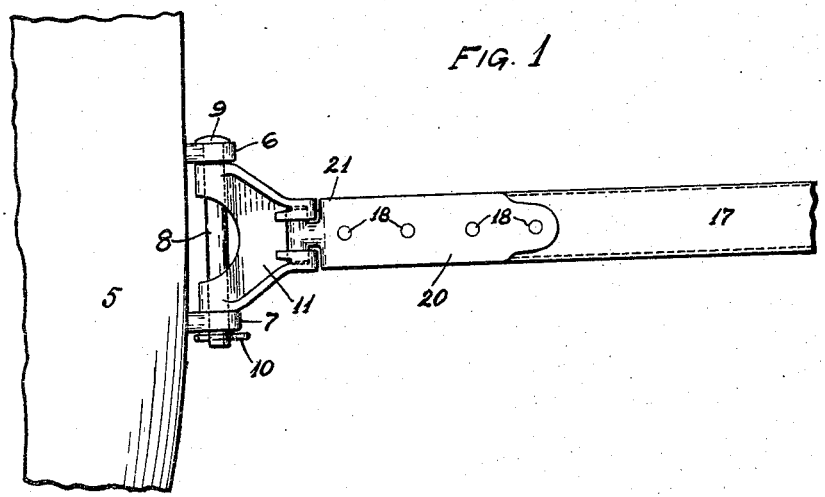
FIG. 1
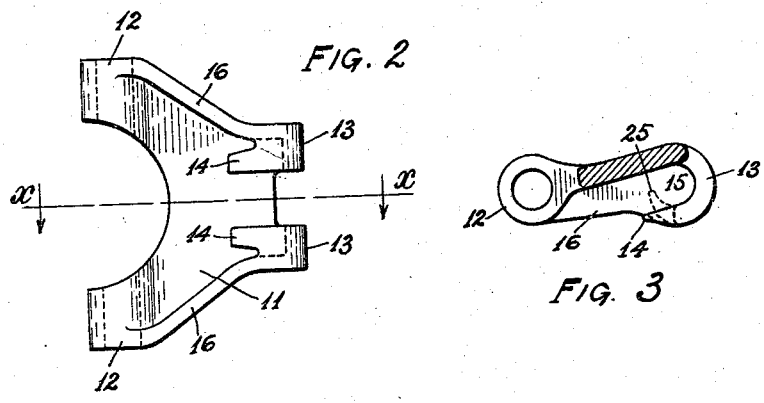
FIG. 2
FIG. 3
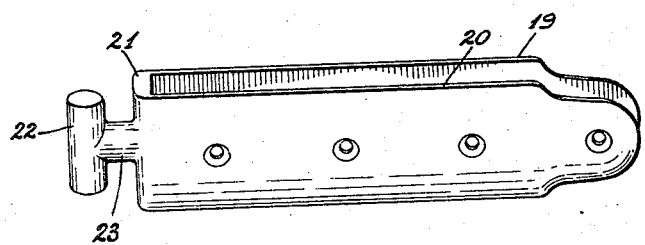
FIG. 4
WITNESSES:
O. Johnson
Geo Blair
INVENTOR
John P. Miller
BY
C.D. Haskins
ATTORNEY

UNITED STATES PATENT OFFICE.

JOHN P. MILLER, OF COLBY, WASHINGTON.

TUG-CONNECTOR FOR HARNESS.

1,185,122.

Specification of Letters Patent. Patented May 30, 1916.

Application filed August 4, 1915. Serial No. 43,527.

*To all whom it may concern:*

Be it known that I, JOHN P. MILLER, citizen of the United States, residing at Colby, in the county of Kitsap and State of Washington, have invented a certain new and useful Improvement in Tug-Connectors for Harness, of which the following is a specification.

My invention relates to improvements in tug connectors for harness, and the object of my improvement is to provide a metal tug connector comprising one member that may be permanently secured to an end portion of a tug and which shall be adapted to be permanently or removably articulated with a link member which link shall be removably articulated with the hame of a harness, whereby said link member by its freedom of motion may serve to permit the tug with which it is associated to be swung freely to different positions without making such short bends in its end portion as would tend to disintegrate and weaken it. I accomplish this object by devices illustrated in the accompanying drawings wherein—

Figure 1 is a view in side elevation showing a fragment of a hame of a harness to which hame is connected a tug by the means of a connector embodying my invention; Fig. 2 is a view in side elevation of a detail of said connector, Fig. 3 is a view of such detail in horizontal section on broken line $x$, $x$ of Fig. 2, and Fig. 4 is an enlarged view in perspective of another detail of said connector.

Referring to the drawings, throughout which like reference numerals indicate like parts, a hame 5 of a harness is provided with two outwardly extending lugs 6 and 7 which are provided each with a hole disposed to extend vertically therethrough and within said holes is disposed a pivot-rod 8 that is provided with a head 9 whose underside rests on the top surface of the lug 6, the lower end portion of said pivot-rod 8, which projects downwardly through and beneath the lug 7, being provided with a transversely disposed hole within which is removably disposed a cotter pin 10 which normally serves to secure said pivot-rod 8 in its position within said lugs 6 and 7. The pivot-rod 8 serves to hinge a link 11 to the lugs 6 and 7, the members 12 of the wider bifurcated end of which link 11 are disposed to swing freely on the pivot-rod 8 with their outer side edges in engagement with the inner surfaces of the lugs 6 and 7 as more clearly shown in Fig. 1. The member 13 of the other and narrower bifurcated end of said link 11 are of hook-like form and terminate with tapered ends 14. Integral with each of the outer side edges of the hook-like members 13 is a wall 15 which merges into a rib 16 that extends along the edge of the link 11 to the member 12 as shown in Figs. 2 and 3.

A tug 17, preferably of leather, is secured by rivets 18 between the bifurcated members 19 and 20 of a connector member 21 which is provided with a catch 22 of cylindrical form which is integrally connected with the member 21 by a shank 23. Fig. 4 by an enlarged view in perspective more clearly shows the form of construction of said connector member 21. The connector member 21 is adapted to be connected with the link 11 to form a hinge-like relation thereto, as shown more clearly in Fig. 1, which operation may be effected by placing the tug 17 with its connector member 21 at a right angle to the ribbed side of the link 11 and then disposing the end portions of the catch 22 within the hook-like members 13 and thereupon the end portion of the tug 17 may be turned to its normal position in line with the plane of the link 11, and while in such normal position the catch 22 cannot be displaced from the hook-like members 13 by reason of the short length of the shank 23.

If it be desired to disconnect the tug 17 from the link 11, then the end portion of the tug 17 with its connector member 21 must be swung again substantially to a right angle with respect to the plane of the link 11 whereupon the catch 22 may easily be withdrawn from the hook-like members 13.

Under some conditions of use, one may desire to make a permanently hinged connection between the end portion of a tug 17 and the link 11, in which case, after the catch 22 is in its position within the hook-like members 13, as shown in Fig. 1, then the tapered ends 14 are to be bent inwardly to the position indicated by dotted lines 25 in Fig. 3, which operation may be effected by striking such ends 14 with a hammer.

In case a connector member 21 of a tug 17 has been permanently connected in a hinge-like manner to a link 11 by bending the tapered ends 14 to the position indicated by dotted lines 25, and it then be desired to remove the tug 17 from its association with the hame 5 of a harness, it will only be necessary to remove the cotter pin 10 and withdraw the pivot-rod 8 from the holes in the lugs 6 and 7, whereupon the link 11 with its attached connector member 21 and the tug 17 will be freed from the hame 5 in an obvious manner.

Manifestly, changes may be made in the forms, dimensions and arrangement of parts of my invention without departing from the spirit thereof.

What I claim is:

In a device of this kind described, the combination with a hame having outwardly-extending lugs and a pivot rod connecting the lugs, of a link comprising a web having bosses at one side provided with openings through which said pivot rod passes, said link further being provided with converging ribs whereby to form upstanding side walls, said ribs terminating in inwardly directed portions extending beyond and bent back over the web to form a pair of spaced hooks open toward the pivot rod and having their terminal ends free whereby to permit bending of the same; in combination with a tug connector having a pivot catch adapted to rest within said hooks and capable of being secured therein by the bending of said extremities.

In witness whereof, I hereunto subscribe my name this 26th day of July, A. D. 1915.

JOHN P. MILLER.

Witnesses:
O. JOHNSON,
A. HASKINS.

Copies of this patent may be obtained for five cents each, by addressing the "Commissioner of Patents, Washington, D. C."